United States Patent [19]

Quazi

[11] Patent Number: 5,841,735
[45] Date of Patent: Nov. 24, 1998

[54] METHOD AND SYSTEM FOR PROCESSING ACOUSTIC SIGNALS

[75] Inventor: Azizul H. Quazi, East Lyme, Conn.

[73] Assignee: The United States of America as represented by the Secretary of the Navy

[21] Appl. No.: 890,479

[22] Filed: Jul. 9, 1997

Related U.S. Application Data

[63] Continuation-in-part of Ser. No. 677,205, Jul. 9, 1996, Pat. No. 5,668,778.

[51] Int. Cl.$^6$ ............................... G01S 3/80; H04B 11/00
[52] U.S. Cl. ............................................. 367/124; 367/131
[58] Field of Search .............................. 367/99, 118, 124, 367/131; 364/421

[56] References Cited

U.S. PATENT DOCUMENTS 5,668,778  9/1997  Quazi ...................................... 367/135

Primary Examiner—Ian J. Lobo
Attorney, Agent, or Firm—Michael J. McGowan; Prithvi C. Lall; Michael F. Oglo

[57] ABSTRACT

A method for processing acoustic signals received by first and second underwater detectors, spaced from each other, for detection and determination of range and bearing of an underwater signal source, includes the steps of obtaining a time series xd of first random variables X from the first detector, obtaining a time series yd of second random variables Y from the second detector, and providing a window of a selected number of digital points of time series xd and yd. The method further includes determining distribution of p(x,y), p(x), and p(y), wherein p(x,y)=joint distribution, p(x)=distribution of x, and p(y)=distribution of y, and estimating mutual information I(X;Y) of the random variables X,Y whereby to obtain a measure of dependence between the random variables X and Y in the window, whereby to determine whether xd and yd come from a single source, and if xd and yd are determined to have come from the same source, computing time differential in receipt of the X and Y signals by the first and second spaced detectors to provide the range and bearing of the source from the first and second detectors. The invention further relates to a system for performing the steps of the above method.

2 Claims, 8 Drawing Sheets

METHOD AND SYSTEM FOR PROCESSING ACOUSTIC SIGNALS

REFERENCE TO CO-PENDING APPLICATION

This application is a continuation-in-part of U.S. patent application Ser. No. 677,205, filed Jul. 9, 1996, in the name of the Applicant, AZIZUL H. QUAZI, now U.S. Pat. No. 5,668,778 issued on September 1997.

STATEMENT OF GOVERNMENT INTEREST

The invention described herein may be manufactured and used by or for the Government of the United States of America for governmental purposes without the payment of royalties thereon or therefor.

BACKGROUND OF THE INVENTION

(1) Field of the Invention

The invention relates to underwater target detection, location and tracking methods and is directed more particularly to acoustic signal processing methods for signals received by spaced apart first and second signal detectors for determination of range and bearing of an underwater target.

(2) Description of the Prior Art

The primary objective of underwater acoustic systems is to detect the presence of acoustic signals emitted or reflected from underwater sources, and to provide estimates of parameters associated with the sources, such as range, bearing, and speed.

It is known to provide two spaced apart acoustic receivers for receiving signals from a single source. The two receivers typically are hydrophone arrays, including a towed array and a hull-mounted array. The two signals from the two receivers are applied to a comparator which produces an output indicative of the degree of correlation between the two signals.

In U.S. Pat. No. 3,532,867, issued Oct. 6, 1970, there is described a delay correlator employing two digital processing channels, each channel having an input for signals derived from a receiver responsive to signals produced by a signal source. Means are provided in each channel for storing data derived from the signal input thereof, and updating means are provided in each channel for regularly replacing old data in the memory thereof. Delay means are coupled to the channels such that information simultaneously received at the receivers of the two channels is read out at different times with respect to each other. The channel outputs are coupled to comparator means to determine at what relationship of read-out times the greatest degree of correlation between the memory outputs is obtained. Conventional signal processing methods, such as the correlation method, include extraction of information from sonar signals using time or frequency domain quantities. Such conventional techniques for data analysis often are not sufficient to characterize the complex dynamics of an underwater source such as a submarine.

Hull and towed arrays cover, respectively, high frequency and low frequency response, and have little or no overlap. Underwater sources generate wide band signals received by the two arrays. The relationship between the two signals cannot be estimated by correlation because of the two frequency bands, wherein there is little or no overlap of frequency band. Thus, such relationship can be estimated by mutual information but not by correlations. Accordingly, there is a need for an acoustic signal processing method in which signals received by a hull array and a towed array can be analyzed to estimate the relationship between the two signals by computation of mutual information.

An object of the invention is, therefore, to provide a method and system for processing underwater acoustic signals received by discrete first and second spaced apart underwater signal detectors.

With the above and other objects in view, as will hereinafter appear, a feature of the present invention is the provision of a method for processing acoustic signals received by discrete first and second underwater signal detectors, spaced from each other, for detection and for determination of range and bearing of an underwater signal source, the method comprising the steps of obtaining a time series xd which is treated as a random variable X from the first detector, obtaining a second time series yd which is treated as a second random variable Y from the second detector, and providing a window of a selected number of digital points of time series xd and time series yd. Although the time series xd is regarded as an output of the first detector, it may be regarded as a reference transmitted signal or model signal based on the reference signal in the case of active sonar, whereas yd could be a received echo contaminated by noise. The method includes the further steps of determining distribution of p(x), p(y), and p(x,y), wherein p(x,y) represents joint distribution, p(x) represents distribution of x, and p(y) represents distribution of y, estimating mutual information I(X;Y) of the random variables X,Y by:

$$I(X;Y) = \sum_x \sum_y p(x,y) \log \frac{p(x,y)}{p(x)p(y)} = \quad (1)$$

$$H(X) - H(X/Y) = H(Y) - H(Y/X) = H(X) + H(Y) - H(X,Y)$$

wherein: H(X) is the entropy of X, H(Y) is the entropy of Y, H(X/Y) is the entropy of X given Y, and H(X,Y) is the joint entropy, whereby to obtain a measure of dependence between the random variables X and Y in the window, whereby to determine whether xd and yd come from a single source; and if xd and yd are determined to have come from the same source, computing time differential in receipt of the X and Y signals by the first and second spaced detectors to provide the range of the source from the first and second detectors.

In accordance with a further feature of the invention, there is provided a system for processing acoustic signals from an underwater source for the determination of range and bearing of the source. The system comprises a first underwater signal detector for obtaining a time series xd of first random variables X, a second underwater signal detector for obtaining a time series yd of second random variables Y, the second detector being spaced from the first detector, means for providing a window of a selected number of digital points of time series xd and yd, and means for determining probability distribution of p(x,y), p(x), and p(y) wherein p(x,y) is the joint probability distribution (hereinafter referred to as "joint distribution"; see "Random Data: Analysis and Measurement Procedures" by Julies S. Bendat and Allan G. Piersol, 1971, John Wiley and Sons, Inc.), p(x) is the marginal probability distribution of x, and p(y) is the marginal probability distribution of y (hereinafter referred to as "distribution of x" and "distribution of y", respectively). The system further includes means for estimating mutual information I(X;Y) of the random variables X,Y, that is, commonality between the two acoustic signals, whereby to obtain a measure of dependence between the X and Y in the window, to determine whether the xd and yd come from a single source, and, if xd and yd are determined to have come from the same source, the system utilizes computer means for computing time differential in receipt of X and Y by the detectors to provide range and bearing of the source from the first and second detectors.

The above and other features of the invention, including various novel details of method steps and combinations thereof, will now be more particularly described with reference to the accompanying drawings and pointed out in the claims. It will be understood that the particular method and system embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings.

DESCRIPTION OF THE PREFERRED EMBODIMENT

Figure 1:
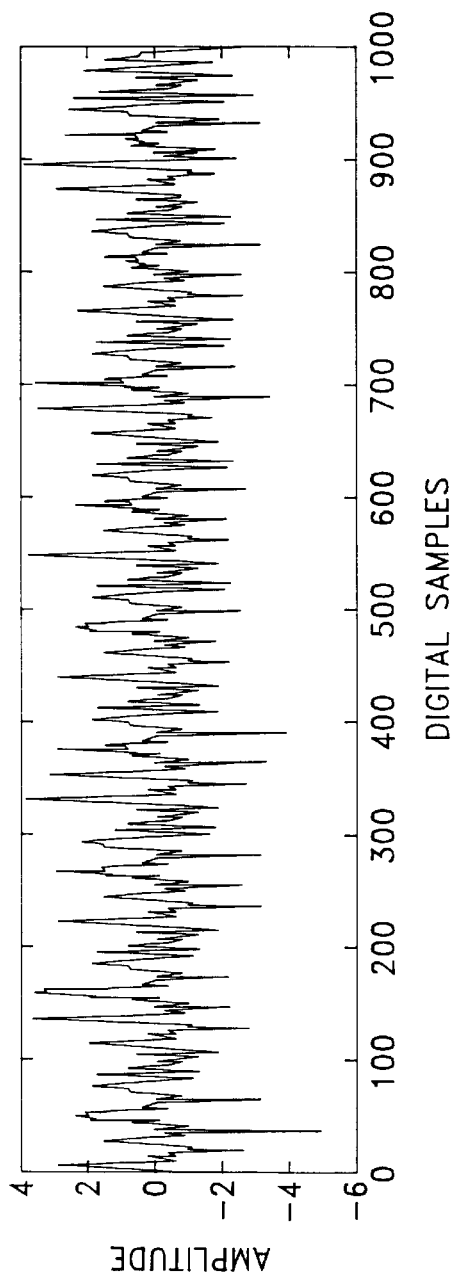
FIG. 1 is a graphical illustration of a time series xd, which is a first detector output and which is regarded as a random variable X.

The method described herein is based on mutual information which is utilized for detection, localization and possible classification of underwater sources. Traditional techniques for data analysis both in the time and frequency domain have not proven sufficient to characterize the complex dynamics of underwater sources, such as submarines. Conventional sonar signals are processed coherently, semi-coherently or incoherently depending upon a prior knowledge of signals. The new signal processing technique described herein is based on mutual information that extracts information, like detection or presence of a source, and its range and bearing.

The primary objective of underwater acoustic systems is to detect the presence of acoustic signals emitted (passive mode) by, or reflected (active mode) from, underwater sources, and to provide estimates of certain parameters, such as range, bearing, size and relative velocity, associated with the sources. In order to receive the emitted or reflected signals from underwater sources, hydrophone arrays are used as sensing devices. The output of such sensing devices contains corrupted signals (reflected or emitted signal with ambient noise) and may be treated as a random variable. It is often desirable to know something about the relationship between the output of one array (such as a towed array) and the output of another array (such as a hull array). One way of bringing to light a possible relationship between two random variables X and Y is to plot the random variables as points in an XY plane and study the resultant plot, which is known as a scatter diagram. If the two random variables, X and Y, are not related to each other, the sample points are typically more or less scattered throughout the plane. On the other hand, if the variables are strongly related to each other, the sample points typically are clustered in the immediate vicinity of a curve describing their functional relationship. The simplest curve is linear dependence, which is of considerable practical importance. In this case, the sample points typically are concentrated along a straight line which can be handled by both correlation techniques and by mutual information techniques. However, if the concentration of the sample points is other than a straight line, correlation techniques fail. Whereas, a technique based on mutual information succeeds in providing useful factors.

The relationship between two random variables can be described by the above-described traditional correlation technique and also by a non-linear mutual information method. If the correlation of the random variables X and Y is zero, then the random variables are said to be uncorrelated or linearly independent. On the other hand, two random variables X and Y that are linearly independent may or may not be statistically independent. Mutual information is a measure of statistical dependency. In other words, if mutual information I(X;Y) equals zero, the correlation is zero, whereas if the correlation is zero, the mutual information may or may not be zero.

The hull array and towed array cover high frequency and low frequency responses, and have little or no overlap. Underwater sources generate wide band signals that are received at both hull and towed arrays. Since the output of the hull array and the towed array come from the same source, there must be some relation between them. This relationship, or dependency, can be estimated by mutual information but not by correlation because the two outputs cover two different frequency bands, and there is little or no overlap of those frequency bands. The correlation may be negligible or zero, but mutual information may show dependency, provided the two outputs are statistically dependent. Mutual information of two random variables X and Y, is defined as:

$$I(X;Y) = \sum_x \sum_y p(x, y) \log \frac{p(x, y)}{p(x)p(y)} = \quad (2)$$

$$H(X) - H(X/Y) = H(Y) - H(Y/X) = H(X) + H(Y) - H(X, Y)$$

where:
H(X)=the entropy of X,
H(Y)=the entropy of Y,
H(X/Y)=the entropy of X given Y,
H(X,Y)=the joint entropy,
p(x,y)=joint distribution,
p(x)=distribution of x,
and
p(y)=distribution of y.

Figure 8:
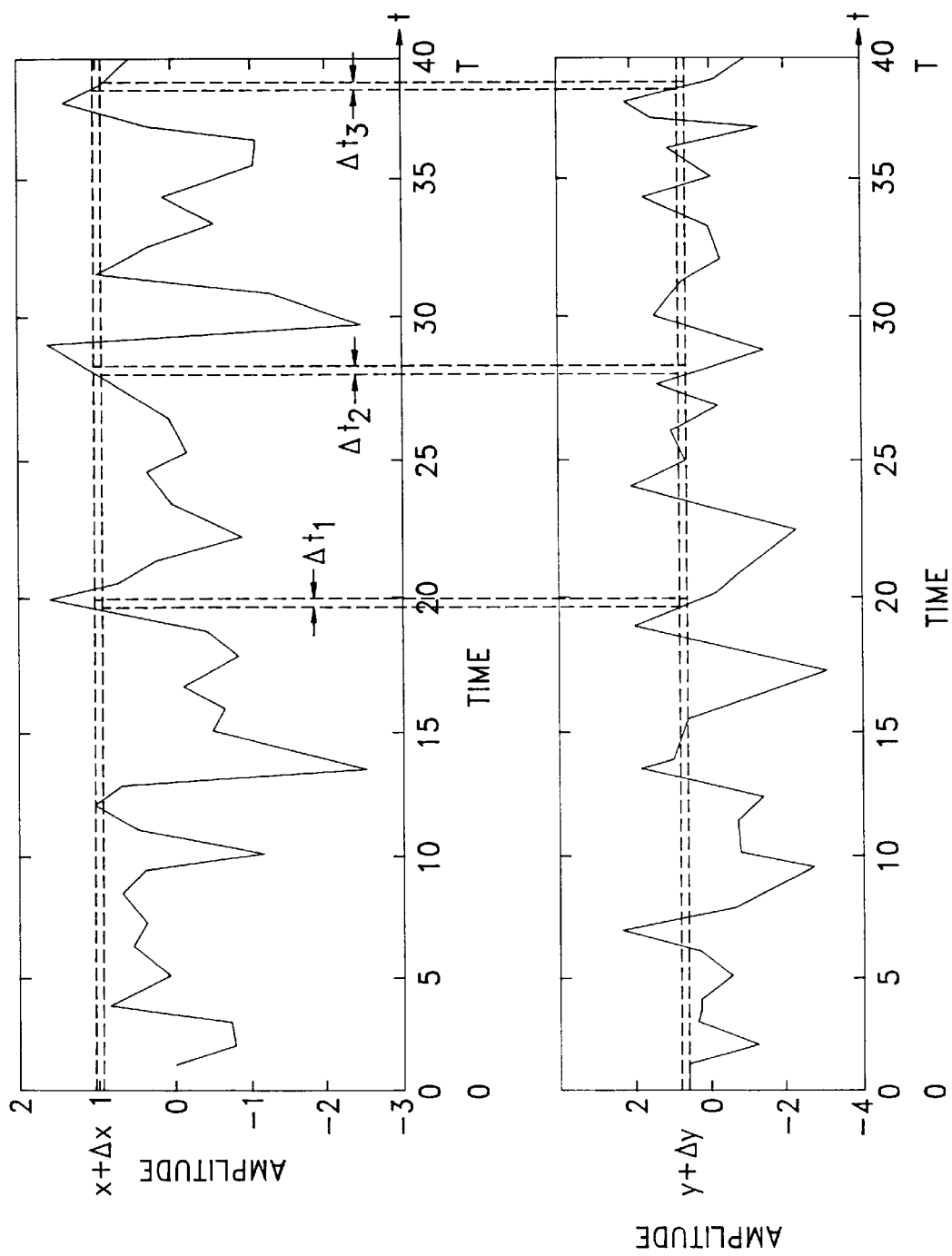
FIG. 8 is a graphical illustration depicting amplitude vs. time, for measurement of joint probability distribution.

Joint distribution can be estimated from xd and yd as follows: The pair of time series records x(t) and y(t) are shown in FIG. 8. The probability that x(t) assumes a value within the range between x and (x+Δx) while y(t) simultaneously assumes a value within the range between y and (y+Δy) may be obtained by taking the ratio $$\frac{T_{xy}}{T} \quad (3)$$

where $T_{xy}$ is the total amount of time that x(t) and y(t) simultaneously fall inside the ranges (x, x+Δx) and (y, y+Δy), respectively, during an observation time T. This ratio will approach an exact probability description as T approaches infinity. That is, the probability $$P[x < x(t) \leq x + \Delta x, y < y(t) \leq y + \Delta y] = \quad (4)$$

$$\lim_{T \mapsto \infty} \frac{T_{xy}}{T}, \text{ where } T_{xy} = \sum_{l=1}^{k} \Delta t_l$$

For small Δx and Δy, a second order (joint) probability density function p(x,y) can be defined as: probability [x<x(t)≦x+Δx, y<y(t)≦y+Δy]≈p(x,y)ΔxΔy. More precisely, $$p(x, y) = \lim_{\substack{\Delta x \to 0 \\ \Delta y \to 0}} \frac{Prob[x < x(t) \leq x + \Delta x, y < y(t) \leq y + \Delta y]}{(\Delta x)(\Delta y)} = \quad (5)$$

$$\lim_{\substack{\Delta x \to 0 \\ \Delta y \to 0}} \lim_{T \to \infty} \frac{1}{T} \left[ \frac{T_{xy}}{(\Delta x)(\Delta y)} \right]$$

p(x) and p(y) can be estimated from p(x,y).

The mutual information I(X;Y) is a measure of the dependence between two random variables X and Y. It is also a measure of nonlinear correlation between measurement points in a time sequence. It is symmetric in X and Y and always non-negative. It is also the reduction of uncertainty of one random variable due to the knowledge of another random variable.

By example, it shall be demonstrated that the mutual information I(X;Y) provides detection and localization and possible classification of underwater objects.

EXAMPLE

Figure 2:
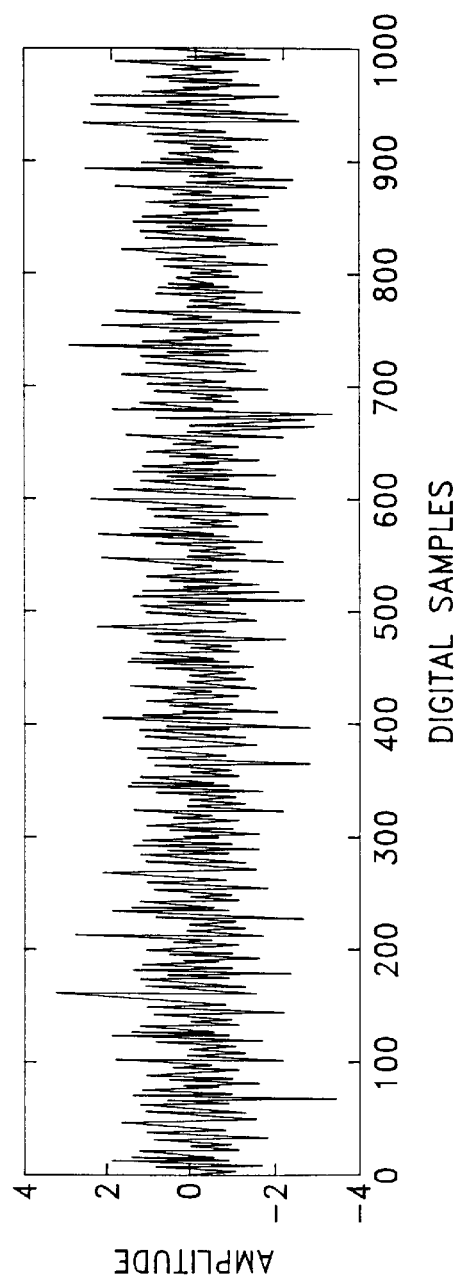
FIG. 2 is a graphical illustration of a time series yd, which is a second detector output and which is regarded as a random variable Y.
Figure 3:
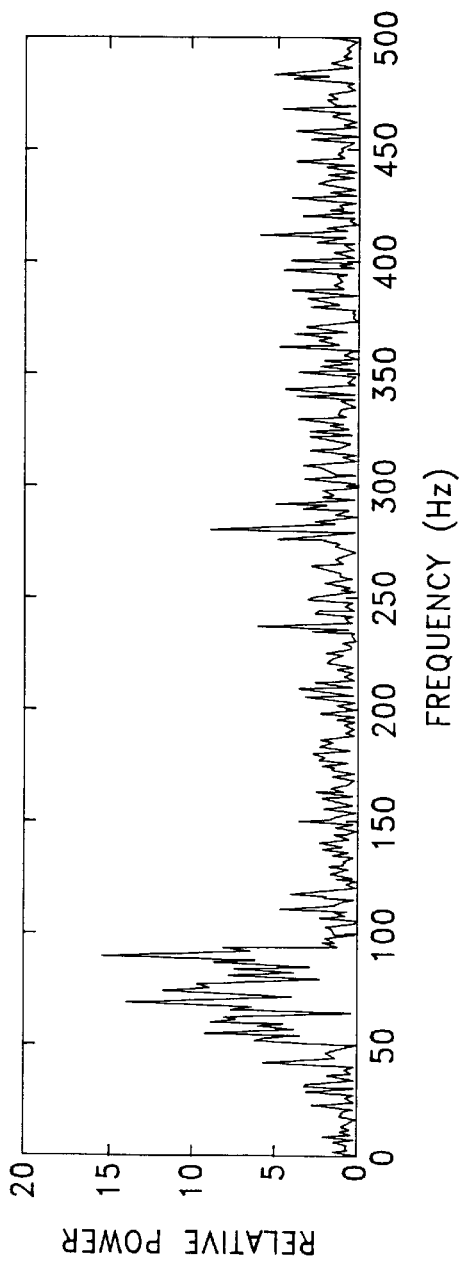
FIG. 3 is a graphical illustration of a spectrum of time series xd.
Figure 4:
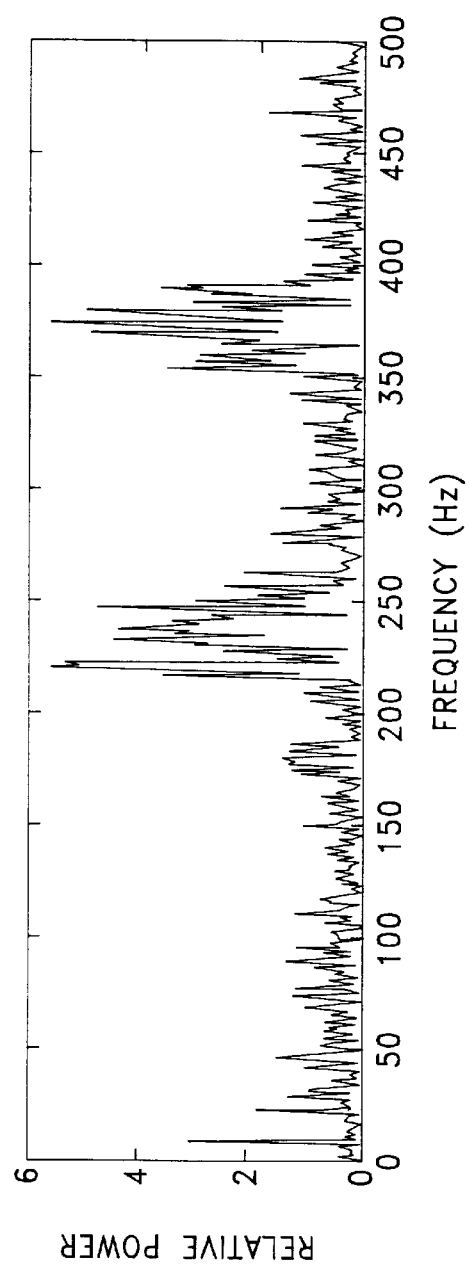
FIG. 4 is a graphical illustration of a spectrum of time series yd.
Figure 10:
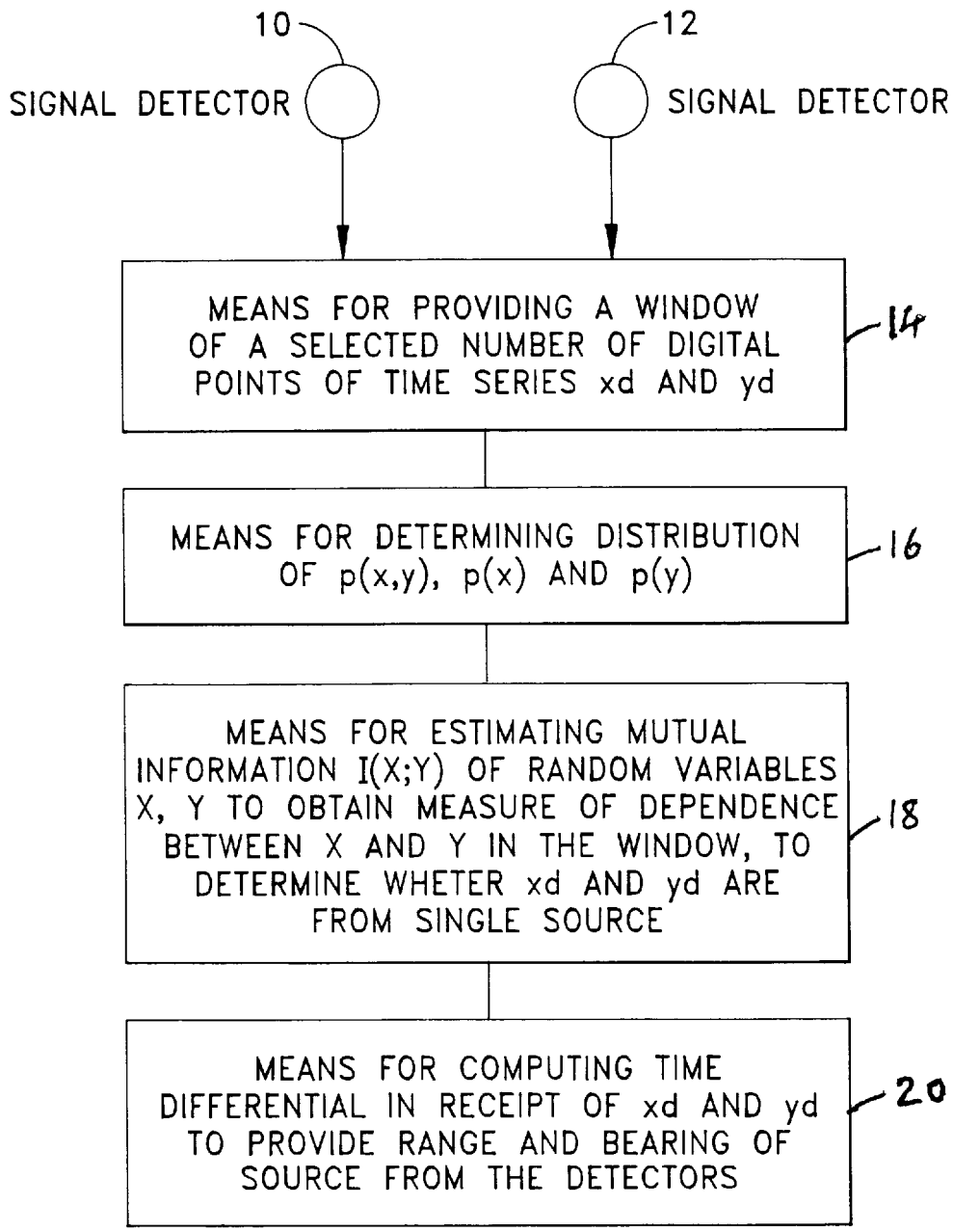
FIG. 10 is a block diagram of one form of system illustrative of an embodiment of the invention.

FIG. 1 shows a time series xd that is composed of a linear frequency modulated broad band signal (50–90 HZ) and random noise in a simulated passive sonar signal. The corresponding spectrum is shown in FIG. 3 (negative frequency is not shown). The signal as shown in FIG. 1 is used as a reference signal. This reference signal is assumed to be received at low frequency sensor 10 (FIG. 10). FIG. 2 shows the time series yd of the frequency shifted signal (at center frequency of 300 Hz) of FIG. 1. This modulation may be regarded as a non-linear transformation of time series xd. In other words, the time series yd is functionally related to time series xd. In practice, source mechanism generates and radiates these types of signals. The spectrum of the signal yd is shown in FIG. 4.

Figure 5:
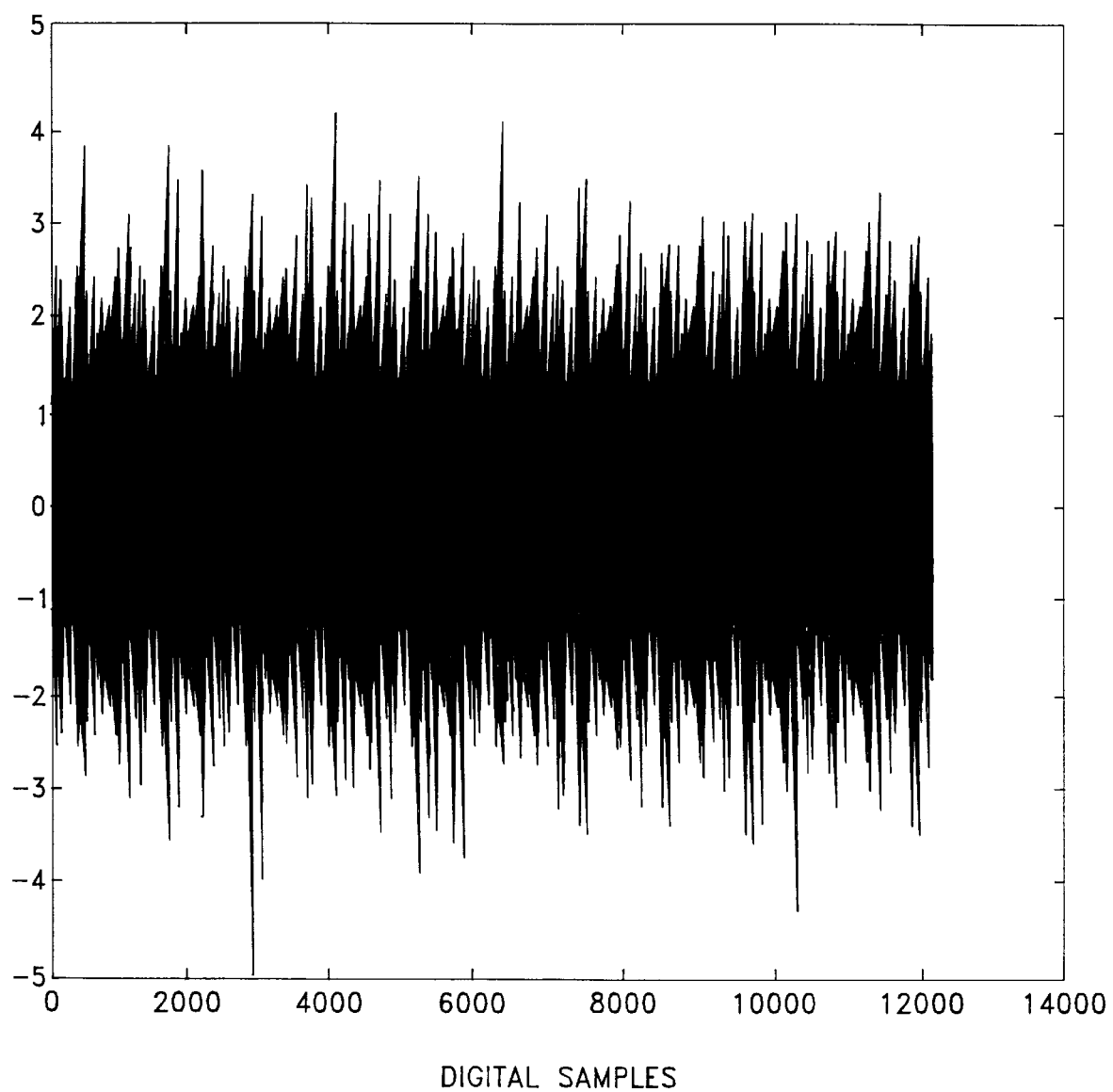
FIG. 5 is a graphical illustration of a time series of noise and a modulated reference signal.

A time series of 12000 digital samples is shown in FIG. 5. The samples from 5001 to 6000 are replaced by digital samples as shown in FIG. 2 and, in addition, a small amount of random noise is superimposed. The remaining samples (1:5000) & (6001:12000) are random numbers generated by MATLAB (a registered trademark of the Math Works, Inc. of Natick, Mass., identifying a reference guide which contains materials relating to the suggested software programs) with zero mean and unit variance. The objective is to show that the mutual information between time series xd (FIG. 1) and time series yd (FIG. 2) can be exploited to detect, localize and possibly classify.

Figure 6:
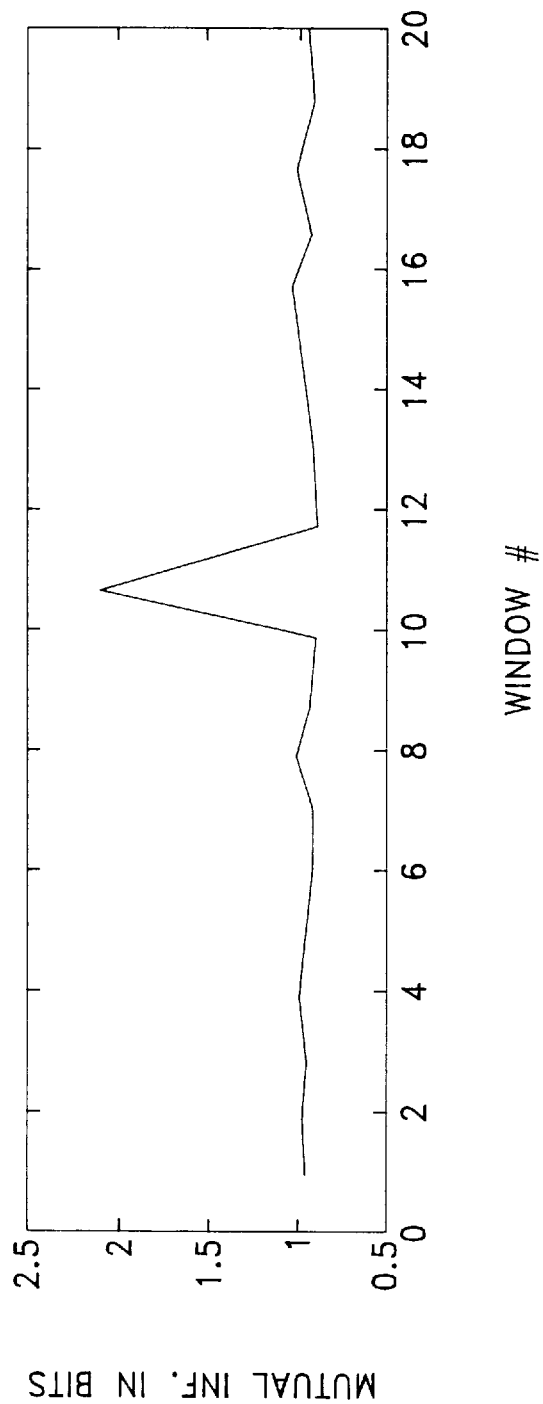
FIG. 6 is a graphical illustration depicting mutual information vs. window numbers in time series of FIG. 5.

The mutual information between time series xd and yd is estimated on a window of 1000 digital points. A sliding window of 50% overlap is used to estimate the mutual information. FIG. 6 shows the estimated mutual information as a function of window number.

In FIG. 6 it is shown that the mutual information is low at all windows except window #11, where it is higher than that of floor level. At window #11, the time series of xd and yd are statistically dependent. The statistical dependency can be measured by mutual information. If a threshold is put at higher than floor level (say at I(X;Y)=1.5 bits), then it can be determined that both signals xd and yd come from the same source. If xd and yd are received at different sensors 10 and 12, which are physically separated, then the peak at window #11 provides information on the differential time delay that, in turn, provides the range of the source from sensors 10 and 12.

Thus far, in the above discussion, it has been assumed that time series xd and yd are outputs of sensor 10 and sensor 12, respectively. In addition, these sensors are located at different places. In the case of an active sonar, it may be assumed that xd is a transmitted signal and is a reference signal, whereas yd is a received echo at window #11 and the rest is noise only. The received echo may be a distorted and modulated version of xd. Alternatively, xd and yd may be passive signals received in sensors of arrays that cover wide band width. Therefore, the above discussions and analysis are also valid for active/passive sonar, radar and geophysical systems.

Figure 7:
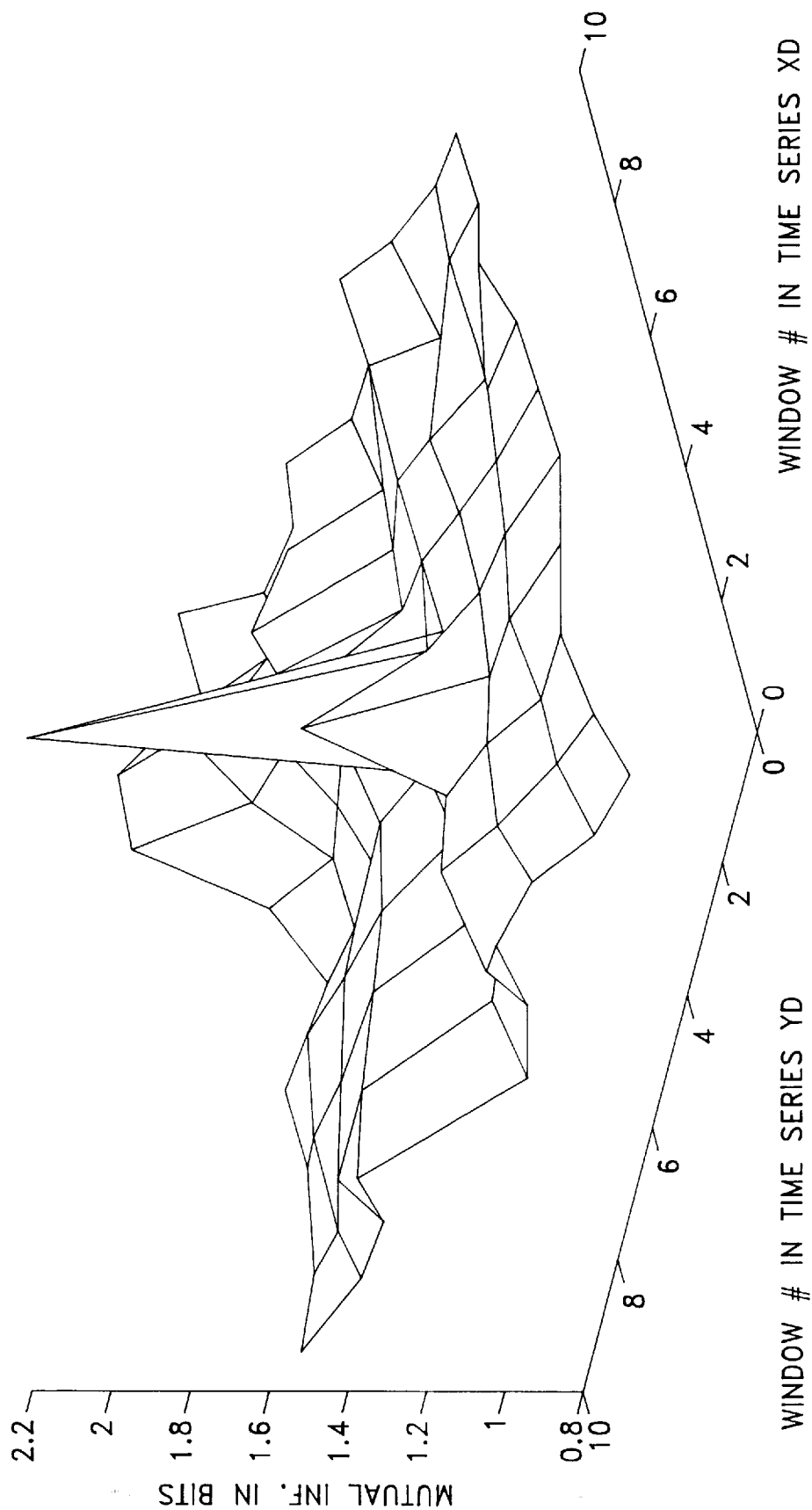
FIG. 7 is a graphical illustration depicting mutual information vs. window numbers in time series xd and yd.

In practice, it is often difficult to select the window size and its beginning and ending from a long time series. Therefore, it is convenient to select a long sequence of time series and then subdivide to a smaller window. For purposes of an example, there has been generated a long sequence of time series xd, just like yd; and there have been taken 10 windows from xd and yd, respectively. The mutual information I(X;Y) is shown in FIG. 7. There is a peak at the expected place in FIG. 7. This type of presentation (FIG. 7) may lead to classification of the source.

Referring to FIG. 10, it will be seen that a preferred embodiment of system illustrative of the invention includes signal detectors 10, 12, computer means 14 for providing a window of a selected number of digital points of time series xd and yd, and computer means 16 for determining distribution of p(x,y), p(x) and p(y). The system further includes computer means 18 for estimating mutual information I(X;Y) of random variables X,Y to obtain a measure of dependence between X and Y in the window, and to determine whether xd and yd are from a single source. The system still further includes computer means 20 for computing time differential in receipt of X and Y, to provide range and bearing of the source from the detectors 10, 12. The above-described system is operative to carry out the aforementioned method.

Figure 9:
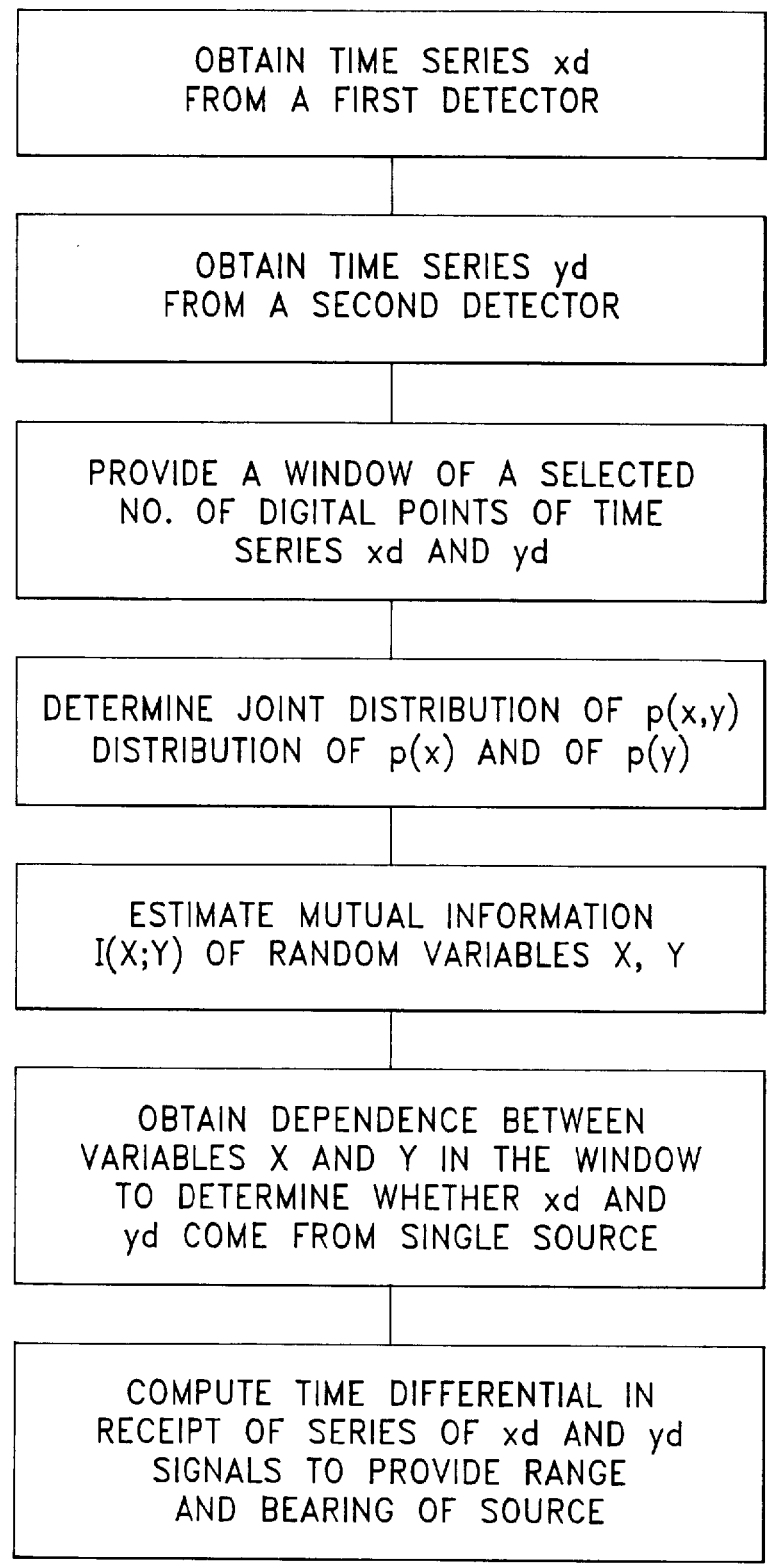
FIG. 9 is a block diagram of one form of method illustrative of an embodiment of the invention.

Referring to FIG. 9, it will be seen that the system of FIG. 10 may be utilized in carrying out the method described above and summarized in FIG. 9, including the steps of obtaining time series xd from a first detector and time series yd from a second detector, providing a window of a selected number of digital points of time series xd and yd, and determining joint distribution of p(x,y), and distribution of p(x) and of p(y). Mutual information I(x;y) of random variables X,Y is then estimated, followed by obtaining dependence between variables X and Y in the window to determine whether xd and yd come from a single source, and computing time differential in receipt of xd and yd signals to provide range and bearing of the signal source.

It is to be understood that the present invention is by no means limited to the particular method steps and system components herein disclosed and/or shown in the drawings, but also comprises any modifications or equivalents within the scope of the claims.

What is claimed is:

1. A method for processing acoustic signals received by discrete first and second underwater signal detectors, spaced from each other, for detection and for determination of range and bearing of an underwater signal source, the method comprising the steps of:

obtaining a time series xd of first random variables X from the first detector;

obtaining a second time series yd of second random variables Y from the second detector;

providing a window of a selected number of digital points of time series xd and time series yd; and determining joint probability distribution of p(x,y), distribution of p(x), and distribution of p(y), wherein:
p(x,y)=joint probability distribution,
p(x)=probability distribution of x, and
p(y)=probability distribution of y;

estimating mutual information I(X;Y) of the random variables X,Y by:

$$\begin{aligned} I(X;Y) &= \sum_x \sum_y \log \frac{p(x,y)}{p(x)p(y)} \\ &= H(X) - H(X/Y) \\ &= H(Y) - H(Y/X) \\ &= H(X) - H(Y) - \underline{H(X,Y)} \end{aligned}$$

wherein:

H(X)=entropy of X
H(Y)=entropy of Y
H(X/Y)=entropy of X given Y
H(X,Y)=joint entropy to obtain a measure of dependence between the random variables X and Y in said window to determine whether xd and yd come from a single source;

if xd and yd are determined to have come from the same source, computing time differential in receipt of a series of the X and Y signals by said first and second spaced detectors to provide the range and bearing of the source from the first and second detectors.

2. A system for processing acoustic signals from an underwater source for determination of range and bearing of the source, the system comprising:

a first underwater signal detector for obtaining a time series xd of first random variables X;

a second underwater signal detector for obtaining a time series yd of second random variables Y, said second detector being spaced from said first detector;

computer means for providing a window of a selected number of digital points of time series xd and yd;

computer means for determining probability distribution of p(x,y), p(x), and p(y) wherein p(x,y)=joint probability distribution, p(x)=probability distribution of x, and p(y)=probability distribution of y; and computer means for estimating mutual information I(X;Y) of the random variables X,Y to obtain a measure of dependence between said X and Y in said window, to determine whether said xd and yd come from a single source, and, if xd and yd are determined to have come from the same source;

computer means for computing time differential in receipt of said X and Y by said detectors to provide range and bearing of the source from said first and second detectors.

* * * * *